United States Patent
Rahman et al.

(10) Patent No.: US 8,140,078 B2
(45) Date of Patent: Mar. 20, 2012

(54) MOBILE DEVICE WITH A MOBILITY ANALYZER AND ASSOCIATED METHODS

(75) Inventors: Shamim Akbar Rahman, Montreal (CA); Guy Cote, Boucherville (CA); Maged Zaki, Pierrefonds (CA)

(73) Assignee: InterDigital Technology Corporation, Wilmington, DE (US)

( * ) Notice: Subject to any disclaimer, the term of this patent is extended or adjusted under 35 U.S.C. 154(b) by 1067 days.

(21) Appl. No.: 11/553,760

(22) Filed: Oct. 27, 2006

(65) Prior Publication Data

US 2007/0104166 A1 May 10, 2007

Related U.S. Application Data

(60) Provisional application No. 60/731,071, filed on Oct. 28, 2005.

(51) Int. Cl.
*H04W 36/00* (2009.01)
*H04W 4/00* (2009.01)

(52) U.S. Cl. ........... 455/440; 370/331; 370/334

(58) Field of Classification Search ........... 370/338, 370/465, 331; 455/440
See application file for complete search history.

(56) References Cited

U.S. PATENT DOCUMENTS

| | | | |
|---|---|---|---|
| 6,829,481 B2 | 12/2004 | Souissi | 455/436 |
| 6,859,653 B1 | 2/2005 | Ayoub et al. | 455/435.2 |
| 6,859,654 B1 | 2/2005 | Reynolds et al. | 455/437 |
| 2003/0193910 A1* | 10/2003 | Shoaib et al. | 370/331 |
| 2006/0084417 A1* | 4/2006 | Melpignano et al. | 455/418 |
| 2006/0217126 A1* | 9/2006 | Sohm et al. | 455/454 |
| 2006/0271560 A1* | 11/2006 | Mitchell | 707/10 |
| 2007/0019670 A1* | 1/2007 | Falardeau | 370/465 |

OTHER PUBLICATIONS

Bauer et al., Predictive Methods for Handover, School of Computing, Staffordshire University, 2002.

* cited by examiner

*Primary Examiner* — Jinsong Hu
*Assistant Examiner* — Opiribo Georgewill
(74) *Attorney, Agent, or Firm* — Allen, Dyer, Doppelt, Milbrath & Gilchrist, P.A.

(57) ABSTRACT

A method for operating a wireless mobile device moving through different types of networks includes storing within the wireless mobile device a type of network associated with a respective access node as the wireless mobile device moves through the different types of networks. A type of connectivity available for each access node is stored within the wireless mobile device, as well as location of each access node. The wireless mobile device is operated with a current access node corresponding to one type of network based on a current location of the wireless mobile device. Handoff is initiated by the wireless mobile device from the current access node to another access node corresponding to a different type of network based on movement of the wireless mobile device.

22 Claims, 5 Drawing Sheets

MOBILE DEVICE WITH A MOBILITY ANALYZER AND ASSOCIATED METHODS

RELATED APPLICATION

This application claims the benefit of U.S. Provisional Application Ser. No. 60/731,071 filed Oct. 28, 2005, the entire contents of which are incorporated herein by reference.

FIELD OF THE INVENTION

The present invention relates to the field of wireless communication systems, and more particularly, to handoff of a wireless mobile device from an access node operating in one type of network to a neighboring access node operating in a different type of network.

BACKGROUND OF THE INVENTION

Handoff of a mobile device from a current access node to a neighboring access node is typically initiated by a base state operating in the current access node. The handoff decision made by the base station is based on current movement of the mobile device. A limitation of this approach requires an external networking node, i.e., the base station, to track location of the mobile device.

In U.S. Pat. No. 6,859,654 a service node is provided in a mobile communications network which collects radio link measurement reports which are transmitted to the service node by mobile stations. The mobile stations transmit the measurement reports in encapsulated form, in the form of SMS messages, in order to prevent the interception of the measurement report by the serving base station. The service node is able to perform handover decision algorithms using the measurement reports collected from the mobile stations in order to determine appropriate radio access nodes to be allocated to the mobile stations.

In a mobile telecommunications system disclosed in U.S. Pat. No. 6,859,653 in which a plurality of different services can be used, a method for the location management of mobile device in the network which uses the mobile devices is provided. An efficient location management is achieved for the different services using location management strategies which are independent of each other, instead of associating the location management strategy to the carrier. A location management strategy includes a plurality of location management procedures which have been selected to adapt and optimize the strategy of a specific service, and which procedures that shall be used for the location management are decided by which service the user for the time being wants to utilize, or to which type of subscription the user subscribes.

In inter-technology networks the decision on which access node to be handed off to requires a greater number of factors to be taken into consideration. This is particularly true when the wireless mobile device is moving from a WLAN to a cellular network or a cellular network to a WiMAX, for example

SUMMARY OF THE INVENTION

In view of the foregoing background, it is therefore an object of the present invention to simplify handoff of a wireless mobile device operating in different types of networks The wireless mobile device uses connection activity reports and user mobility reports to initiate a handoff in inter-technology networks. In view of these reports, another object of the present invention is to improve user services by downloading data in anticipation of usage. Yet another object of the present invention is to track location of the wireless mobile device with respect to the different types of networks This and other objects, features, and advantages in accordance with the present invention are provided by a method for operating a wireless mobile device moving through different types of networks, with each network comprising at least one access node. The method comprises storing within the wireless mobile device a type of network associated with a respective access node as the wireless mobile device moves through the different types of networks, and storing within the wireless mobile device a type of connectivity available for each access node. Location of each access node is also stored within the wireless mobile device. The method may further comprise operating the wireless mobile device with a current access node corresponding to one type of network based on a current location of the wireless mobile device, and initiating handoff by the wireless mobile device from the current access node to another access node corresponding to a different type of network based on the current location of the wireless mobile device.

The different types of networks may comprise Bluetooth, WiFi, WiMAX, WLAN and cellular, for example. The types of connectivity may comprise voice and data, for example. The wireless mobile device uses connection activity reports and user mobility reports to initiate handoff in inter-technology networks.

The type of connectivity available for each access node permits a user of the wireless mobile device to request services supported thereby. The method may further comprise creating the connection activity report of the services requested by the user moving through the different types of networks, including location of where the services were requested. The current movement of the wireless mobile device is tracked At least one of the services on the connection activity report may be initiated without user request based on the wireless mobile device approaching the location where the at least one service was previously requested.

Services include downloading news or sports information, for example, every morning when the user is at a particular bus stop on his way to work. Based on preferences of the user access different access nodes while moving through the different types of networks on a regular basis, the connection activity report can be used to predict and initiate actions of the user based on these past user preferences.

In addition, the user mobility report of the access nodes supporting services requested by the user moving through the different types of networks may be created, including location of where the services were requested. Again, the current movement of the wireless mobile device is tracked. An access node on the user mobility report may be selected for the handoff based on the wireless mobile device approaching the location where one of the services was previously requested so that the selected access node supports that service.

For the wireless mobile device to find everything manually, it takes time, even if unlimited time and battery life are available. The idea is to use the mobility and connection information to track the networks as the user moves though them, especially if this is done regularly. Operating the wireless mobile device in the future will be faster because of the stored information that allows predictive analysis to be performed in order to determine which access node to connect to in the next mile or so.

The access nodes may also provide information to the wireless mobile device that is used to initiate handoff by the wireless mobile device from the current access node to another access node. The information provided by the access nodes may comprise at least one of device type, location coordinates, an access technology list, networking capability, available services, access cost, and an access node neighbors lists.

As noted above, handoff of the wireless mobile device may be further based on the type of connectivity available at the current location. Likewise, handoff of the wireless mobile device may be further based on a user preference for a service provided by an access node at the current location. Usage of the access nodes may also be monitored by the wireless mobile device so that handoff to another access node may be further based on the monitored usage of the access nodes.

Another aspect of the present invention is directed to a wireless mobile device for moving through different types of networks. The wireless mobile device may comprise a transceiver, a processor coupled to the transceiver, and a mobility and connection module coupled to the transceiver and to the processor for performing the above described method.

Figure 1:
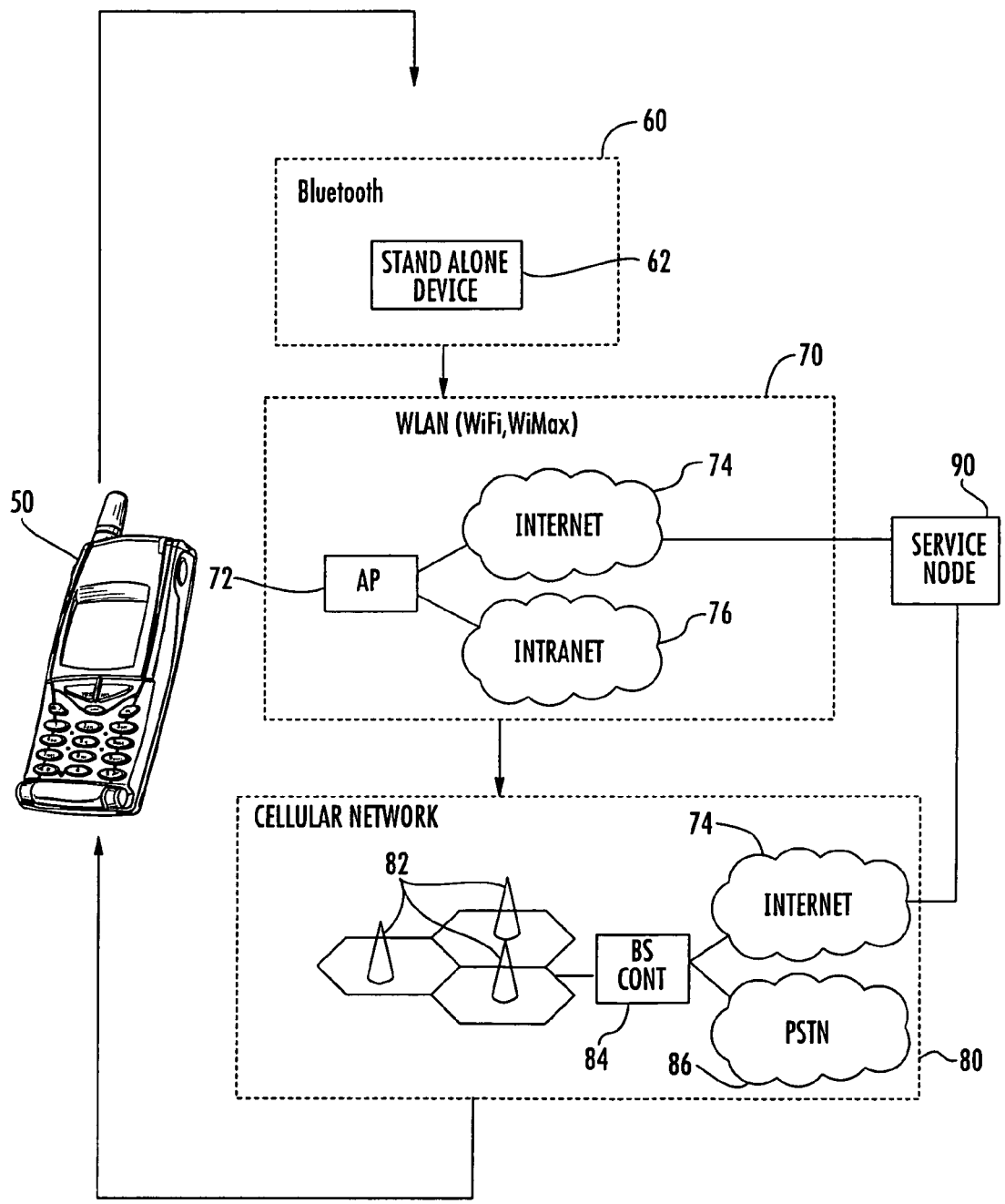
FIG. 1 is an illustration of a wireless mobile device operating in different types of wireless networks in accordance with the present invention.

FIG, 2 is a flowchart for operating the wireless mobile device shown in FIG. 1.

Figure 3:
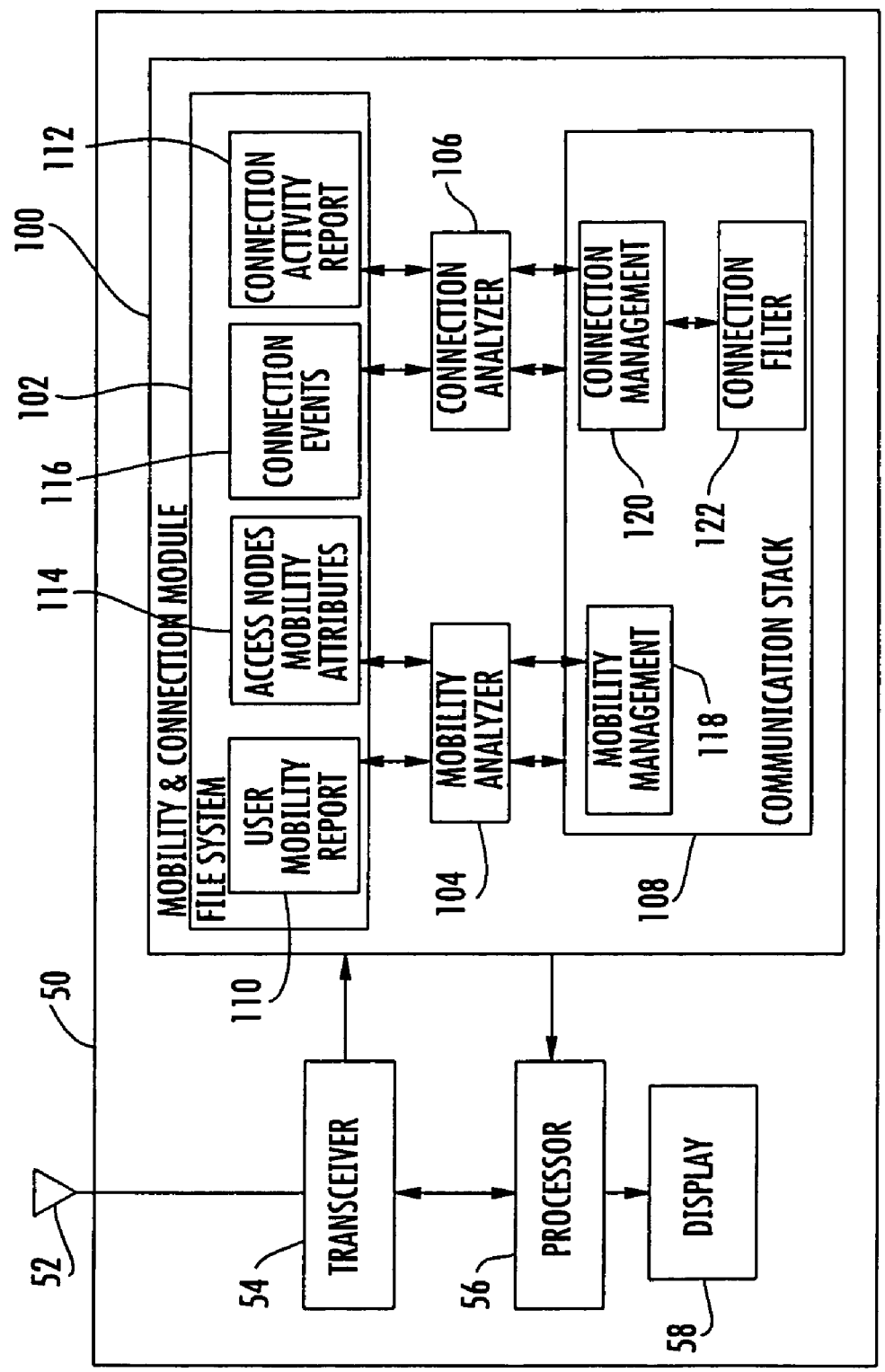

FIG. 3 is a block diagram of the wireless mobile device shown in FIG. 1.

Figure 4:
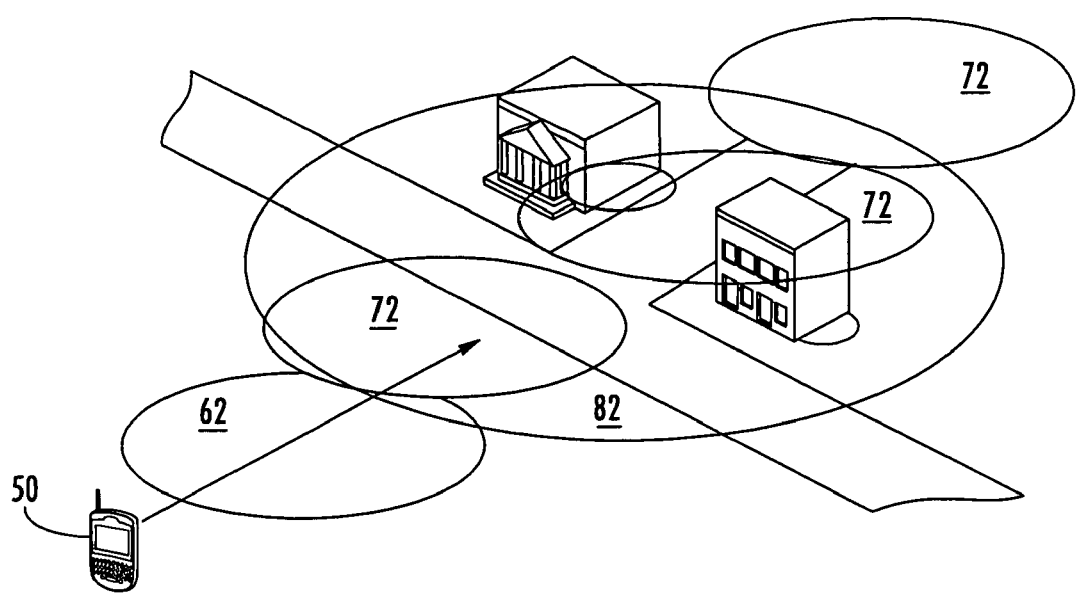

FIG. 4 is another illustration of the wireless mobile device shown in FIG. 1 operating in different types of wireless networks.

Figure 5:
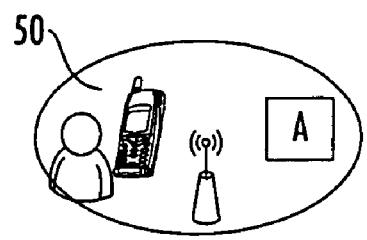

FIG. 5 is an illustration of a single access node being added to a list of access nodes for a wireless mobile device in accordance with the present invention.

Figure 6:
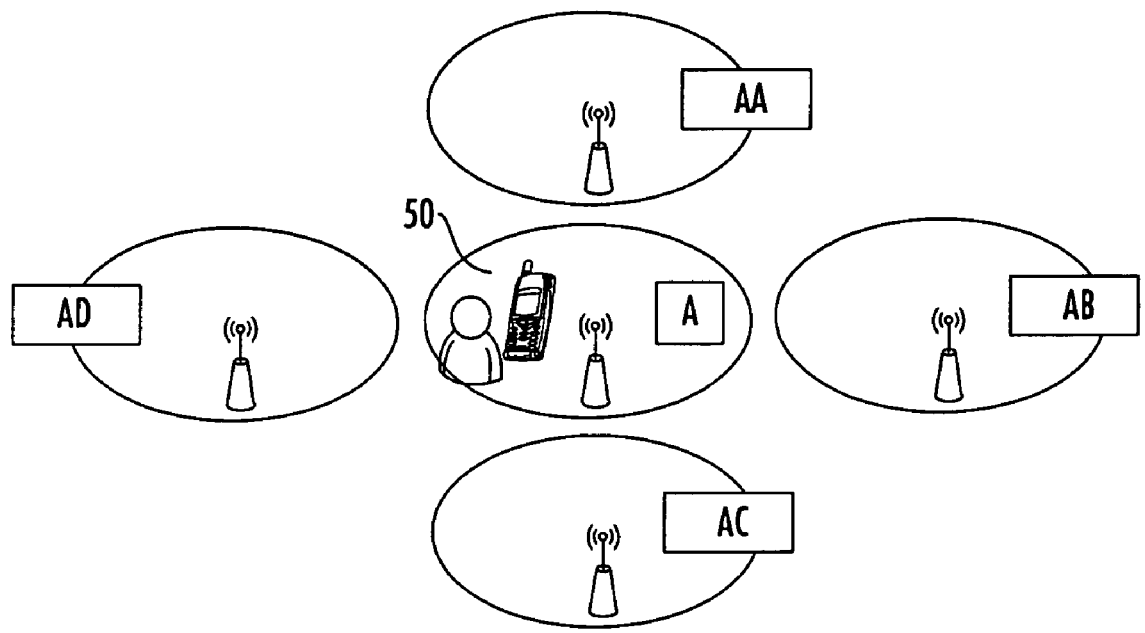

FIG. 6 is an illustration of neighboring access nodes being added to a list of access nodes for a wireless mobile device in accordance with the present invention,

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 2:
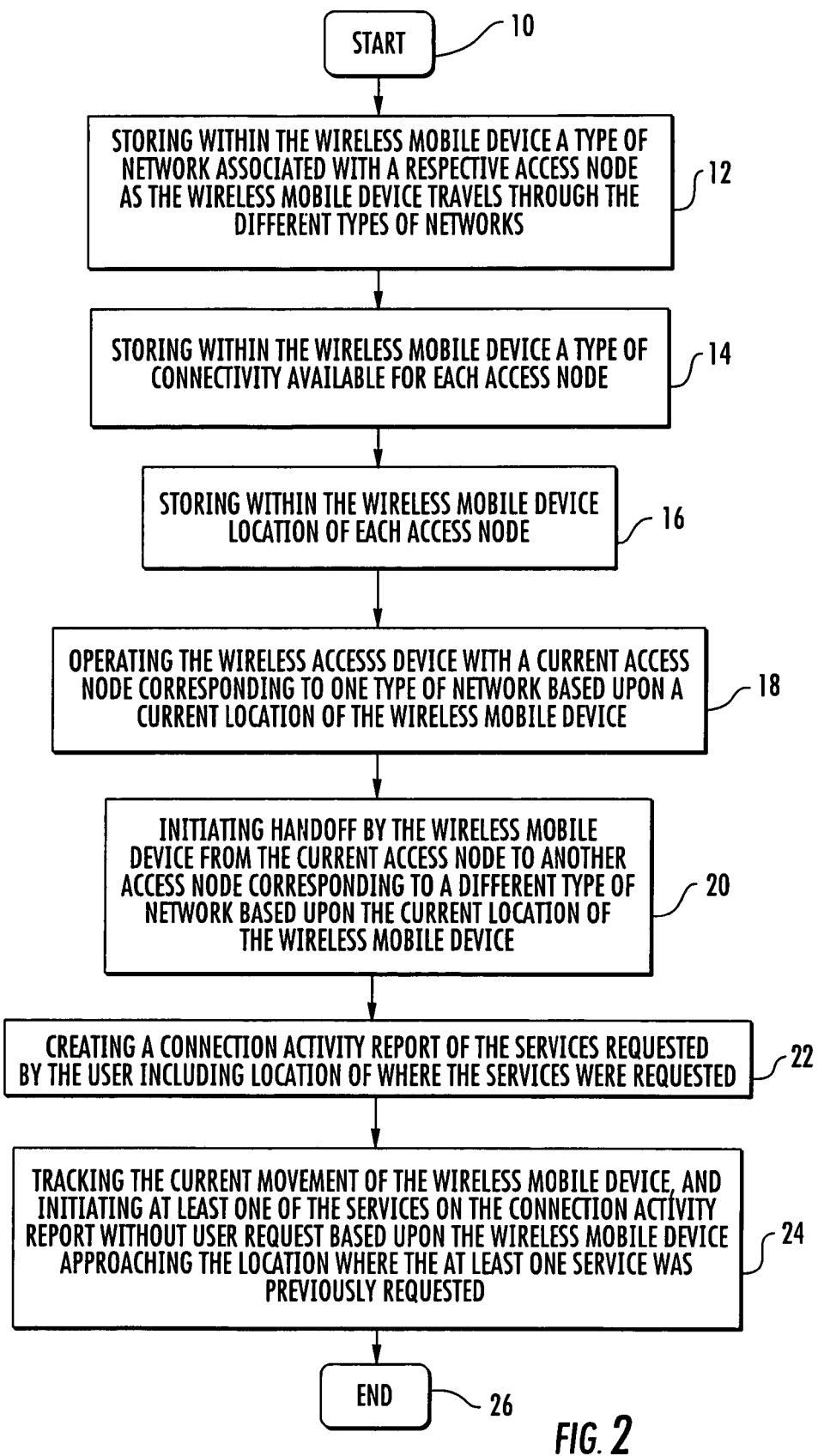

Referring initially to FIGS. 1 and 2, a method for operating a wireless mobile device 50 moving through different types of networks 60, 70, 80 will be discussed. Each network 60, 70, 80 comprises at least one access node 62, 72, 82. From the start (Block 10), the method comprise storing within the wireless mobile device 50 at Block 12 a type of network associated 60, 70, 80 with a respective access node 62, 72, 82 as the wireless mobile device moves through the different types of networks. The illustrated networks include a Bluetooth network 60, a WLAN 70 that includes other unlicensed wireless networks such as WiFi and WiMAX, for example, and a cellular network 80.

Each network includes at least one access node. An access node is a generic term to describe different wireless technology nodes that provide network coverage via radio signals. The access node 62 in the Bluetooth network 60 is the actual device being connected to the wireless mobile device 50, such as an automatic teller machine (ATM), for example, This device is a stand-alone device since it is not connected to any other device.

The access node 72 in the WLAN 70 is an access point. The illustrated access point 72 is connected to the Internet 74 and to an Intranet 76. Even though only one access point 72 is illustrated, the network 70 may include more access points depending on the desired coverage area of the network. The access node 82 in the cellular network 80 includes more than one base station coupled to a base station controller 84. The base station controller 84 is then coupled to the Internet 74 and to a public switched telephone network (PSTN) 86. As will be discussed in greater detail below, a service node 90 is coupled to the Internet 74 and can interface with the wireless mobile device 50.

The method further comprises storing within the wireless mobile device 50 a type of connectivity available for each access node at Block 14. Each type of connectivity is used to provide particular types of services to the wireless mobile device 50.

In the illustrated example, the connectivity available in the Bluetooth network 60 is connection to an ATM 62. Typical ATM services are provided to the user of the wireless mobile device 50. High-speed data access is available via the Internet 74 or via the intranet 76 in the WLAN 70. The intranet 76 may be associated with a place of employment, for example. In the cellular network 80, voice is provided via the PSTN 86 and high-speed data service is available via the Internet 74.

The location of each access node is stored within the wireless mobile device 50 at Block 16. The wireless mobile device 50 is operated with a current access node corresponding to one type of network based on a current location of the wireless mobile device at Block 18. Selection of the current access node may be determined by either the wireless access node 50 or by one of the networks 60, 70, 80.

A handoff is initiated by the wireless mobile device 50 at Block 20 from the current access node to another access node corresponding to a different type of network based on movement of the wireless mobile device. The wireless mobile device 50 thus initiates handoff among the different types of access nodes, i.e., inter-technology transfers, instead of relying on the access nodes to determine the appropriate handoff. Of course, the wireless mobile device 50 can also initiate handoffs to different access nodes within the same technology network, such as among the different base stations 82 in the cellular network 80, for example.

Instead of relying strictly on position to determine which access node to initiate handoff to, other factors may be taken into consideration by the wireless mobile device 50. If two different networks can both connect to the Internet 74, yet one of the connections is susceptible to noise and interference, then the wireless mobile device 50 selects the better quality connection.

Other factors include the services normally provided to wireless mobile device 50 as it repeatedly moves through the networks on a regular basis. For instance, if the user downloads sports scores via the wireless mobile device 50 when waiting at the same bus stop every morning, the wireless mobile device 50 will initiate handoff to the network providing Internet 74 access even though other networks are available for providing other services.

The type of connectivity available for each access node permits a user of the wireless mobile device 50 to request services supported thereby. Another unique feature of the wireless mobile device 50 is that an activity log of the services requested by the user is created at Block 22, including location of where the services were requested. At Block 24, movement of the wireless mobile device 50 is tracked, and at least one of the logged services is initiated without user request based on the wireless mobile device approaching the location where the at least one logged service was previously requested.

For instance, if the user downloads sports scores every morning at the bus stop on the way to work, the wireless mobile device 50 can initiate the download without user input when the wireless mobile device is in proximity to the bus stop, This particular feature requires the wireless mobile device 50 to not only select the right network, but to also signal the appropriate network to initiate pre-downloading (caching) of the data. To initiate pre-downloading of the data, the wireless mobile device 50 signals the appropriate newspaper Internet web server and request that the sports pages are downloaded to an appropriate access technology. Of course, the user may be prompted to confirm download of the sport scores before the actual downloading is performed. The method ends at Block 24

A block diagram of the wireless mobile device 50 will now be discussed in reference to FIG. 3 The wireless mobile device 50 includes an antenna 52, a transceiver 54 coupled to the antenna, a processor 56 coupled to the transceiver, and a display 58 coupled to the processor. A mobility and connection module 100 is coupled to the transceiver 54 and processor 56 for performing the steps outlined in FIG. 2. The mobility and connection module 100 is implemented as a combination of hardware and software. The module 100 may be a standalone chip within the wireless mobile device 50. Alternatively, the module 50 may be divided into multiple chip sets within the wireless mobile device.

The module 100 comprises a file system 102, a mobility analyzer 104, a connection analyzer 106, and a communication stack 108. The communication stack 108 includes a mobility manager 118, a connection manager 120 and a connection filter 122.

The file system 102 stores mobility and connection records. In particular, the mobility and connection records include a user mobility report 110 and a connection activity report 112. The file system 102 also stores access nodes mobility attributes 114 and connection events 116. In the communication stack 108, the mobility manager 118 transmits and receives via the transceiver 54 mobility messages with the different type networks. The connection manager 120 transmits and receives via the transceiver 54 connection messages with the different type networks.

The mobility analyzer 104 records and analyzes mobility access node information. Part of its functionality is to find a set of possible access nodes that could be used next based on user preferences. The original and resulting information may be sent to the wireless network provider. The connection analyzer 106 records and analyzes connection information. The original and resulting information may also be sent to the wireless network provider. The connection filter 122 filters incoming connection attempts, and is partially configured by the network provider based on the network connection history.

In the illustrated example, the wireless mobile device 50 is moving through three different types of networks 60, 70, 80. For the wireless mobile device 50 to find everything manually, it takes time even if unlimited time and battery life are available. The idea is to use the mobility and connection module 100 to track the networks 60, 70, 80 based on movement of the wireless mobile device 50, especially if this movement is repeated on a regular basis. Consequently, the mobility and connection module 100 uses analysis of past events to anticipate or predict which network to connect to in the next mile or so as the wireless mobile device 50 is moving in a particular direction.

The mobility and connection module 100 is beneficial since moving habits of people are similar most of the time, i.e., commuting to work, weekend trips, etc. The mobility analyzer 104 tracks user moving patterns by recording access node mobility attributes. The connection analyzer 106 then processes the stored information to develop a custom user mobility context.

The created user mobility context can be used to provide several different services, such as selecting the next access node based on user criteria, pre-loaded data for user services on access nodes, and helping optimize mobile network communications.

The mobility analyzer 104 requires logging of mobility and connection events. The mobility analyzer 104 records information based on reachable access nodes as the wireless mobile device 50 moves around the different existing wireless networks. As illustrated in FIG. 4, the wireless mobile device 50 moves through access nodes 62, 72 and 82. Access node 82 overlaps with access nodes 62 and 72.

Access node mobility attributes are provided by an exchange of standard formatted messages. An access node provides its mobility attributes by broadcasting mobility attribute advertisement messages at regular intervals. A wireless mobile device 50 may also directly request this information using mobility attribute request messages. As an alternative, these two messages may be broadcast at the IP level so that it is independent of any particular radio technology. As yet another alternative, these messages may be broadcast by the service node 90.

The access node mobility attributes 114 stored in the file system 102 may comprise the following: unique access node and provider identifiers, mobility attribute advertisement broadcast rate, device type (mobile phone, WLAN access point, cellular base station, etc.) mobility (fixed/mobile, mesh capable, etc.), GPS coordinates (used if fixed), remote access technology list (GSM, UMTS, 802.11 and others), networking capability (bandwidth, QoS, security, etc.), available services (news, video, music, etc.), access cost, and immediate access node neighbors list.

The immediate access node neighbor's list is a list composed of the closest access node neighbors, i.e., the next neighboring cells. Initially, access node A is selected and added in FIG. 5, In FIG. 6, access node A has four neighboring nodes AA, AB, AC and AD. These nodes are added to the list of access nodes available to the wireless mobile device 50.

Each of the list entries has a reference field used to directly reach the neighboring access nodes via the Internet 74. This enables the wireless mobile device 50 to get neighboring access node mobility attributes in advance by using the Internet 74. Using several recursions of this process, the wireless mobile device 50 is able to grow its list of access nodes, expending the area covered. The wireless mobile device 50 decides at what recursion depth it will stop.

In addition to the access node attributes, the mobility analyzer 104 keeps an access node usage count. This enables the use of statistics for predicting the next access node the wireless mobile device 50 is going to cross.

The mobility analyzer 104 records other mobility events such as handover and service interruptions. Also, the connection analyzer 106 records connection events such as establishment (remote identification, QoS), data exchange (achievable throughput, congestion), and termination.

The mobility analyzer 104 will at regular intervals identify the access nodes that are part of the user moving habits creating the user mobility report 110, at the same time the connection analyzer 106 will monitor the log of past connections creating a connection activity report 112. The user mobility report 110 includes the sequence of handover (source and destination access nodes, frequency) and the access node usage counter.

Looking at the sequence of handover, the wireless mobile device 50 can anticipate the next area the mobile device is going to go through. The wireless mobile device 50 can then select the next access node based on pre-configured criteria such as the cheapest, the fastest or the available services on access nodes. Note that this process can be combined with location services when available.

User mobility report information can also be transmitted to the wireless network provider to enable additional user services. The user mobility report can be used by the network to update the regularly visited access nodes with information related to subscribed user services (news, music, video, exc.) or targeted local advertisement. For example, a store near a frequently used access node would provide an updated catalog, daily specials and video publicity.

The access node list and statistics of mobile users can be used by network providers to optimize their wireless network. The networks can determine if access nodes need to be moved to better areas, if additional access nodes need to be added, and if additional storage capacity needs to be added to them.

Connection and mobility information can be used to prevent hacking or mobile attacks. At regular intervals, the network will retrieve connection and mobility information from wireless mobile devices 50. The network will then be able to determine if those mobile devices 50 were victims of remote connected device attacks (by analyzing the mobility and connection sequence of events) If it finds malicious devices, the network can then add those devices definition to a list of filtered devices This filtered device list 122 is then distributed to all mobile devices that are part of the provider wireless network The filtered device list 122 will then be used by the mobile devices to setup their firewalls.

The service node 90 is provided in a mobile communications network for collecting radio link measurement reports that are transmitted to it by wireless mobile devices 50. The wireless mobile devices 50 transmit link measurement reports in encapsulated form (in the form of SMS messages, for example) to prevent the interception of the measurement report by the serving access nodes The service node 90 is able to perform handover decision algorithms using the measurement reports collected from the wireless mobile devices to determine appropriate radio access nodes to be allocated to the wireless mobile devices.

A predictive method for handover includes using history of mobility events (stored on base stations). The present invention is also directed to a hybrid handover method that uses mobile location information with signal quality to optimize the networking resources. The method specifies the handover case in a hierarchical network of macro and micro cells. When a mobile device 50 switches micro cells frequently, it may be better to switch to the macro cells instead.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for operating a wireless mobile device moving through different types of networks, each network comprising at least one access node, the method comprising:
   storing within the wireless mobile device a type of network associated with a respective access node as the wireless mobile device moves through the different types of networks, with each type of network having access node mobility attributes associated therewith;
   storing within the wireless mobile device a type of connectivity available for each access node;
   storing within the wireless mobile device location of each access node;
   operating the wireless mobile device with a current access node corresponding to one type of network based on a current location of the wireless mobile device;
   creating a connection activity report of services requested by the user moving through the different types of networks, including location of where the services were requested, and with the services including downloading of predetermined information from the Internet;
   initiating handoff by the wireless mobile device from the current access node to another access node corresponding to a different type of network based on the current location of the wireless mobile device, with the another access node being selected based on the access node mobility attributes associated therewith; and
   tracking the current movement of the wireless mobile device, and initiating the downloading of the predetermined information from the Internet based on the wireless mobile device approaching the location where the at least one service was previously requested.

2. A method according to claim 1 wherein the type of connectivity available for each access node permits a user of the wireless mobile device to request services supported thereby; and further comprising:
   creating a user mobility report of the access nodes supporting services requested by the user moving through the different types of networks, including location of where the services were requested; and
   tracking the current movement of the wireless mobile device, and selecting an access node on the user mobility report for the handoff based on the wireless mobile device approaching the location where one of the services was previously requested so that the selected access node supports that service.

3. A method according to claim 1 wherein the access nodes provide information to the wireless mobile device that is used to initiate handoff by the wireless mobile device from the current access node to another access node.

4. A method according to claim 3 wherein the information provided by the access nodes comprises at least one of device type, location coordinates, an access technology list, networking capability, available services, access cost, and an access node neighbors lists.

5. A method according to claim 3 wherein the information is provided to the wireless mobile device via the Internet.

6. A method according to claim 1 further comprising the wireless mobile device determining its current location.

7. A method according to claim 1 wherein handoff of the wireless mobile device is further based on the type of connectivity available at the current location.

8. A method according to claim 1 wherein handoff of the wireless mobile device is further based on a user preference for a service provided by an access node at the current location.

9. A method according to claim 1 further comprising monitoring usage of the access nodes by the wireless mobile device; and wherein handoff of the wireless mobile device to another access node is further based on the monitored usage of the access nodes.

10. A method according to claim 1 wherein the different types of networks comprises at least one of Bluetooth, WiFi, WiMAX, WLAN and cellular.

11. A method according to claim 1 wherein the types of connectivity comprise voice and data.

12. A wireless mobile device for moving through different types of networks, each network comprising at least one access node, the wireless mobile device comprising:
    a transceiver;
    a processor coupled to said transceiver; and
    a mobility and connection module coupled to said transceiver and to said processor for performing the following:
        storing a type of network associated with a respective access node as the wireless mobile device moves through the different types of networks, with each type of network having access node mobility attributes associated therewith,
        storing a type of connectivity available for each access node,
        storing location of each access node,
        operating said transceiver with a current access node corresponding to one type of network based on a current location of the wireless mobile device,
        creating a connection activity report of services requested by the user moving through the different types of networks, including location of where the services were requested, and with the services including downloading of predetermined information from the Internet,
        initiating handoff from the current access node to another access node corresponding to a different type of network based on the current location of the wireless mobile device, with the another access node being selected based on the access node mobility attributes associated therewith, and
        tracking the current movement of the wireless mobile device, and initiating the downloading of the predetermined information from the Internet based on the wireless mobile device approaching the location where the at least one service was previously requested.

13. A wireless mobile device according to claim 12 wherein the type of connectivity available for each access node permits a user of the wireless mobile device to request services supported thereby; and wherein said mobility and connection module further performs the following:
    creating a user mobility report of the access nodes supporting services requested by the user moving through the different types of networks, including location of where the services were requested; and
    tracking the current movement of the wireless mobile device, and selecting an access node on the user mobility report for the handoff based on the wireless mobile device approaching the location where one of the services was previously requested so that the selected access node supports that service.

14. A wireless mobile device according to claim 12 wherein the access nodes provide information to said transceiver that is used by said mobility and connection module to initiate handoff from the current access node to another access node.

15. A wireless mobile device according to claim 14 wherein the information provided by the access nodes comprises at least one of device type, location coordinates, an access technology list, networking capability, available services, access cost, and an access node neighbors lists.

16. A wireless mobile device according to claim 14 wherein the information is provided to said transceiver via the Internet.

17. A wireless mobile device according to claim 12 wherein said mobility and connection module is configured for determining the current location of the wireless mobile device.

18. A wireless mobile device according to claim 12 wherein handoff is further based on the type of connectivity available at the current location.

19. A wireless mobile device according to claim 12 wherein handoff is further on a user preference for a service provided by an access node at the current location.

20. A wireless mobile device according to claim 12 wherein said mobility and connection module monitors usage of the access nodes by said transceiver; and wherein handoff is further based on the monitored usage of the access nodes.

21. A wireless mobile device according to claim 12 wherein the different types of networks comprises at least one of Bluetooth, WiFi, WiMAX, WAN and cellular.

22. A wireless mobile device according to claim 12 wherein the types of connectivity comprise voice and data.

* * * * *

UNITED STATES PATENT AND TRADEMARK OFFICE
CERTIFICATE OF CORRECTION

| | |
|---|---|
| PATENT NO. | : 8,140,078 B2 |
| APPLICATION NO. | : 11/553760 |
| DATED | : March 20, 2012 |
| INVENTOR(S) | : Rahman et al. |

It is certified that error appears in the above-identified patent and that said Letters Patent is hereby corrected as shown below:

Column 5, Line 10      Delete: "stop, This"
Insert: --stop. This--

Column 7, Line 35      Delete: "devices This"
Insert: --devices. This--

Column 7, Line 37      Delete: "network The"
Insert: --network. The--

Column 7, Line 45      Delete: "nodes The"
Insert: --nodes. The--

Column 10, Line 43      Delete: "WAN"
Insert: --WLAN--

Signed and Sealed this
Tenth Day of July, 2012

David J. Kappos
*Director of the United States Patent and Trademark Office*